United States Patent
Shibata et al.

(10) Patent No.: US 7,371,151 B2
(45) Date of Patent: May 13, 2008

(54) LENS STOCKING APPARATUS AND LENS PROCESSING SYSTEM HAVING THE SAME

(75) Inventors: Ryoji Shibata, Toyokawa (JP); Akihiro Nagura, Okazaki (JP)

(73) Assignee: Nidek Co., Ltd., Aichi (JP)

( * ) Notice: Subject to any disclaimer, the term of this patent is extended or adjusted under 35 U.S.C. 154(b) by 68 days.

(21) Appl. No.: 10/574,097

(22) PCT Filed: Jan. 17, 2005

(86) PCT No.: PCT/JP2005/000799

§ 371 (c)(1),
(2), (4) Date: Mar. 31, 2006

(87) PCT Pub. No.: WO2005/068130

PCT Pub. Date: Jul. 28, 2005

(65) Prior Publication Data

US 2007/0141950 A1 Jun. 21, 2007

(30) Foreign Application Priority Data

Jan. 15, 2004 (JP) .............................. 2004-008546

(51) Int. Cl.
*B24B 49/00* (2006.01)
(52) U.S. Cl. ............................ 451/11; 451/5; 451/331; 414/788.1; 414/793.8
(58) Field of Classification Search .................. 451/42, 451/65, 331, 334, 255, 256, 5, 10, 11, 43; 414/788.1, 793.8
See application file for complete search history.

(56) References Cited

U.S. PATENT DOCUMENTS

| 5,716,256 | A | 2/1998 | Mizuno et al. |
| 6,159,072 | A | 12/2000 | Shibata |
| 6,974,298 | B2 * | 12/2005 | Tanaka .................... 414/788.1 |
| 2004/0018801 | A1 | 1/2004 | Mizun et al. |
| 2004/0029496 | A1 * | 2/2004 | Mizuno et al. ............... 451/43 |
| 2005/0106999 | A1 * | 5/2005 | Vulich et al. .................. 451/5 |
| 2006/0276106 | A1 * | 12/2006 | Inoguchi ........................ 451/5 |

FOREIGN PATENT DOCUMENTS

| EP | 1 375 065 A1 | 1/2004 |
| JP | 63-247222 A | 10/1988 |
| JP | 9-253999 A | 9/1997 |
| JP | 11-77474 A | 3/1999 |
| JP | 2004-34166 A | 2/2004 |

* cited by examiner

*Primary Examiner*—Eileen P. Morgan
(74) *Attorney, Agent, or Firm*—Sughrue Mion, PLLC

(57) ABSTRACT

A lens stocking apparatus capable of stocking a plurality of lenses, which has a first stage, on which a plurality of trays respectively accommodating lenses are mountable, for transferring a tray, a vertically movable second stage, on which a plurality of trays respectively accommodating lenses are mountable by being vertically stacked, for receiving a tray, a tray movement unit that has a holding portion, which is adapted to hold a tray, and that is configured to move a tray from the first stage to the second stage, and a guide unit adapted to guide a position of at least a topmost one of trays mounted on the second stage.

9 Claims, 10 Drawing Sheets

LENS STOCKING APPARATUS AND LENS PROCESSING SYSTEM HAVING THE SAME

TECHNICAL FIELD

The present invention relates to a lens processing system for processing a lens, and a lens stocking apparatus for stock a lens.

BACKGROUND ART

For example, in the case of eyeglass lenses, the processing of the lenses, which has hitherto been performed by individual optician's shops, has come to be intensively performed at a processing center. The processing center intensively processes many lenses in response to orders from optician's shops. In this intensive processing, it is desired to achieve laborsaving (or automation) of a sequence of processes, which relate to the lens processing, as much as possible. Thus, for instance, JP-A-2004-34166, US-2004-0018801-A1, and EP-1375065-A1 have proposed a lens stocking apparatus and a lens processing system having this lens stocking apparatus, in which an unprocessed lens is taken out of a lens accommodating tray or the like, is conveyed, and is set in a lens processing apparatus, and in which a processed lens is taken out of the processing apparatus, is conveyed, and is put on (or returned to) the tray or the like.

Meanwhile, a lens accommodating tray 1401 used in such a lens processing system is formed at its bottom surface portion with legs 1401b, so that the tray 1401 can be placed on the top surface of another tray 1401 by vertically stacking the trays 1401 on top of each other. These legs 1401b are adapted to be inserted into an open portion 1401a of the lower tray 1401 (see FIG. 9(a)). Further, the inside size IS of the open portion 1401a is set to be slightly larger than the outside size OS of the legs 1401b. However, the difference between these sizes sometimes causes the positional displacement of the tray 1401 when the trays 1401 are stacked or when a stage 1420 on which the trays 1401 are put is vertically moved (see FIG. 9(b)).

DISCLOSURE OF INVENTION

Technical problems to be solved by the present invention are to provide a lens stocking apparatus on which lens accommodating trays is mounted by accurately stacking lens accommodating trays, and to provide a lens processing system having this lens stocking apparatus.

To solve the aforementioned problems, the present invention features that the invention has the following arrangement.

(1) A lens stocking apparatus capable of stocking a plurality of lenses, comprising:
a first stage for transfer, on which a plurality of trays each accommodating a lens are mountable;
a second stage for reception, capable of vertically moving, on which a plurality of trays each accommodating a lens are mountable by being vertically stacked;
a tray movement unit that includes a holding portion for holding a tray, the tray movement unit moving a tray from the first stage to the second stage; and
a guide unit that guides a position of at least a topmost one of trays stacked on the second stage.

(2) The lens stocking apparatus according to claim (1), wherein, the guide unit guides the position of the topmost tray when a tray moved by the tray movement unit from the first stage is stacked on trays already stacked on the second stage.

(3) The lens stocking apparatus according to (2), wherein the guide unit includes a guide member provided in the holding portion.

(4) The lens stocking apparatus according to (3), wherein
the holding portion includes two clamp arms for holding a tray therebetween,
the guide member is provided in each of arms and has a vertical length sufficient so that the guide member downwardly protrudes from a bottom surface portion of a tray held by the arms, and
the guide member abuts against the topmost tray and guides the position of the topmost tray when the held tray is stacked on trays already stacked on the second stage.

(5) The lens stocking apparatus according to (3), further comprising a second guide member provided in the holding portion for guiding a position of a tray held by the holding portion.

(6) The lens stocking apparatus according to (2), wherein the guide unit includes a guide member fixed to guide the position of the topmost tray when the topmost tray on the second stage is moved by moving the second stage to a height, at which a tray to be moved from the first stage can be stacked on the topmost tray.

(7) The lens stocking apparatus according to (1), wherein the first stage includes a stage capable of vertically moving, on which a plurality of trays are mountable by being vertically stacked, or a stage capable of horizontally moving, on which a plurality of trays are mountable by being horizontally arranged.

(8) A lens processing system including the lens stocking apparatus according to (1), comprising:
a lens processing apparatus for processing an edge of a lens; and
a lens conveying apparatus for conveying an unprocessed lens, which is stocked in the stocking apparatus, from the stocking apparatus to the processing apparatus so as to process the unprocessed lens in the processing apparatus, and for convey the lens, which is processed in the processing apparatus, from the processing apparatus to the stocking apparatus so as to stock the processed lens again in the stocking apparatus.

(9) The lens processing system according to (8), wherein
a tray for accommodating the unprocessed lens is mounted on the first stage of the stocking apparatus,
a tray for accommodating the processed lens is mounted on the second stage of the stocking apparatus,
the lens conveying apparatus conveys the unprocessed lens from the tray mounted on the first stage and conveys the processed lens to the same tray mounted on the first stage, and
the tray movement unit moves the tray, which accommodates the processed lens, from the first stage to the second stage.

BEST MODE FOR CARRYING OUT THE INVENTION

Figure 1:
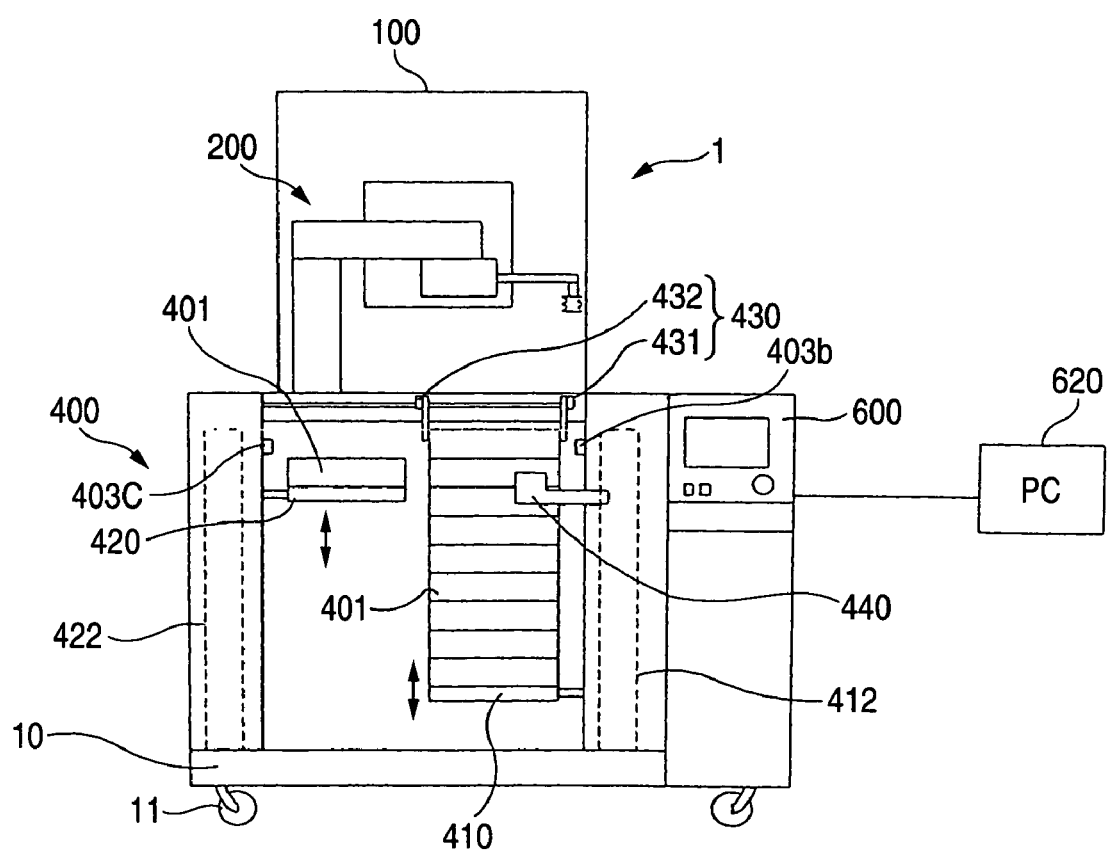
FIG. 1 is a schematic front view illustrating an eyeglass lens processing system according to the invention.
Figure 2:
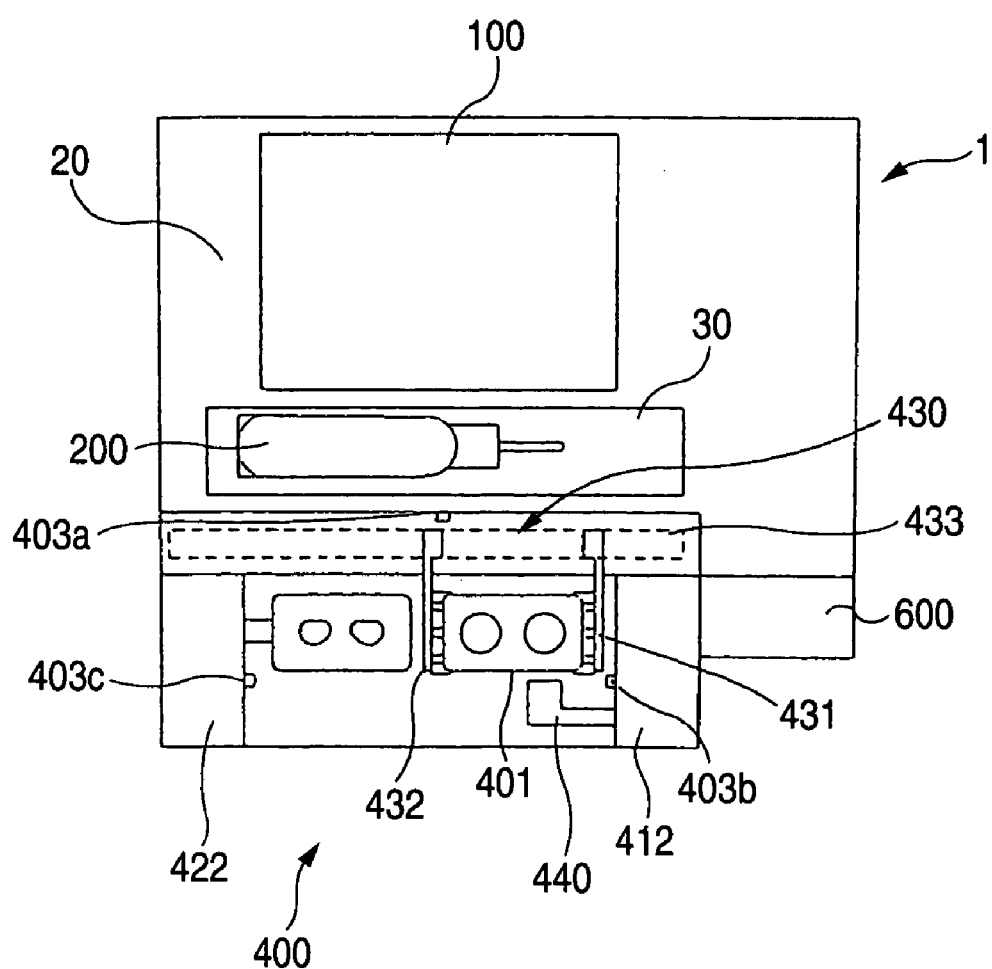
FIG. 2 is a schematic plan view illustrating the eyeglass lens processing system, which is taken from above.

Hereinafter, an embodiment of the invention is described with reference to the accompanying drawings. FIG. 1 is a schematic front view illustrating an eyeglass lens processing system according to the invention. FIG. 2 is a schematic plan view illustrating the eyeglass lens processing system, which is taken from above.

The processing system 1 is provided with a lens processing apparatus 100 for processing an eyeglass lens LE, a robotic hand apparatus (RH apparatus) 200 for conveying the lens LE, a tray (lens) stocking apparatus 400 for stocking lens accommodating trays 401 each of which accommodates a pair of left and right lenses LE, and a system control portion 600 for controlling each of these apparatuses. The system control portion 600 is connected to a host computer (host PC) 620 for managing ordering data.

Each of the apparatuses is mounted on a base 10. Casters 11 are attached to the base 10. The entire processing system 1 (the respective apparatuses) can move as one unit.

A barcode, into which a work No. is encoded, is placed on a side surface of the tray 401 and is read by a barcode reader 440.

The processing apparatus 100 is placed on a table 20 that is provided on the base 10. The RH apparatus 200 moves along a movement passage 30 provided at the front side of the processing apparatus 100. The stocking apparatus 400 is placed at the front side of the processing apparatus 100 by interposing the movement passage 30 between these apparatuses.

Next, each of the apparatuses that the processing system 1 has is described.

<Lens Processing Apparatus>

Figure 3:
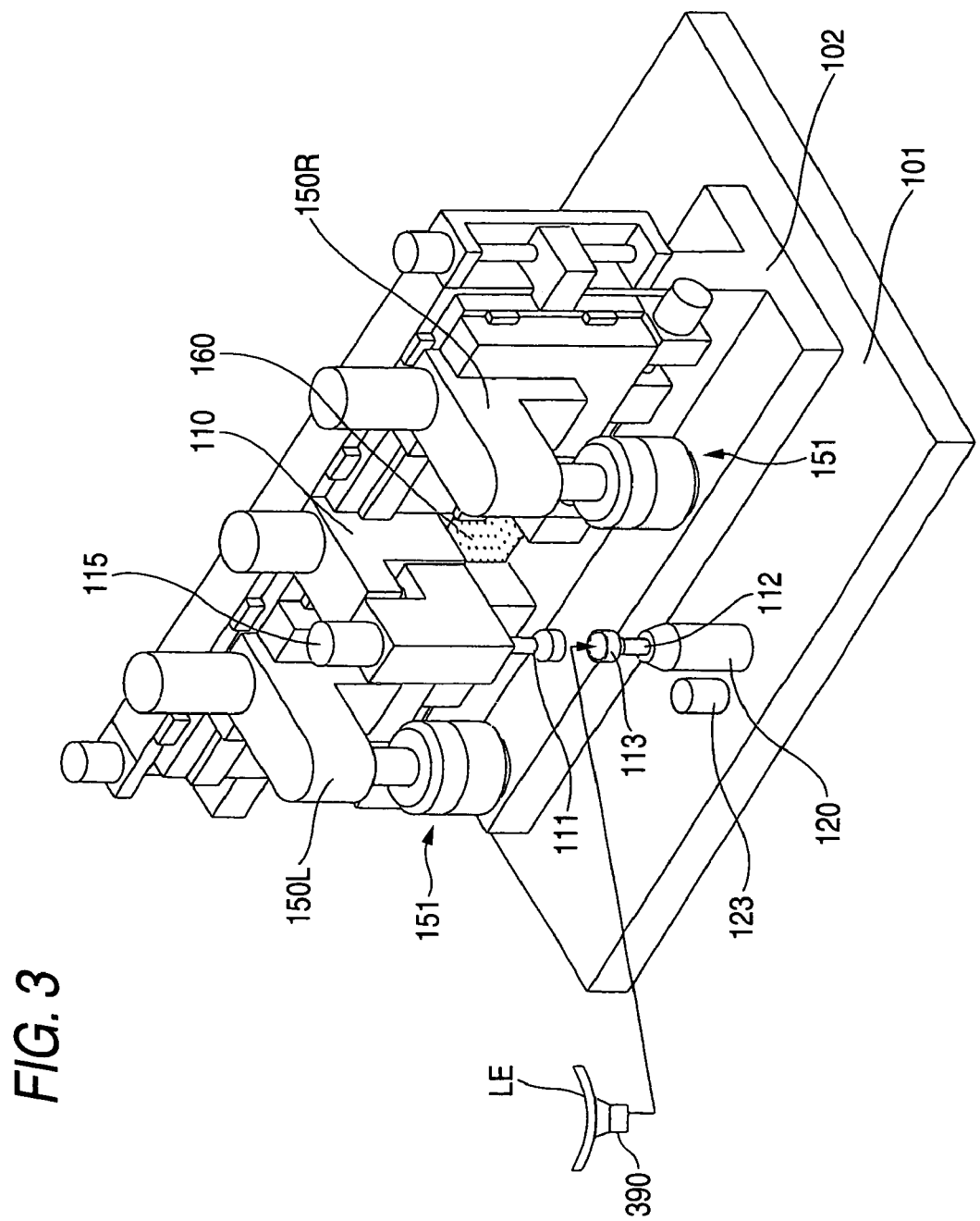
FIG. 3 is a schematic view illustrating the configuration of a lens processing apparatus.

FIG. 3 is a schematic view illustrating the configuration of the processing apparatus 100. The processing apparatus 100 chucks and holds the lens LE by using chuck shafts 111 and 112, which extend vertically. The upper chuck shaft 111 is vertically moved by a vertical movement mechanism portion 110 provided at the center of a sub-base 102, and is rotated by a motor 115. The lower chuck shaft 112 is rotatably held by a holder 120 fixed to a main base 101 and is rotated by a motor 123 in synchronization with the chuck shaft 111.

To hold the lens LE by the chuck shafts 111 and 112, a cup 390 serving as a processing jig is attached to the lens LE through an adhesive pad. A cup holder 113, into which a base portion of the cup 390 is inserted, is attached to the chuck shaft 112.

The lens LE held by the chuck shafts 111 and 112 is processed from two directions by grinding-portions 150R and 150L each of which has a grinding stone 151 provided on a rotating shaft. The grinding portions 150R and 150L are laterally symmetrical and are laterally and vertically moved by movement mechanism portions provided on the sub-base 102.

A lens shape measuring portion 160 is accommodated in the central inner side of the sub-base 102. When lens processing is performed, processing water is jetted to the processed part of the lens LE from a nozzle (not shown).

Incidentally, the configuration of this processing apparatus 100 is basically similar to that disclosed in U.S. Pat. No. 5,716,256 (JP-A-9-253999). Thus, refer to the U.S. Pat. No. 5,716,256 (JP-A-9-253999).

<RH Apparatus>

Figure 4:
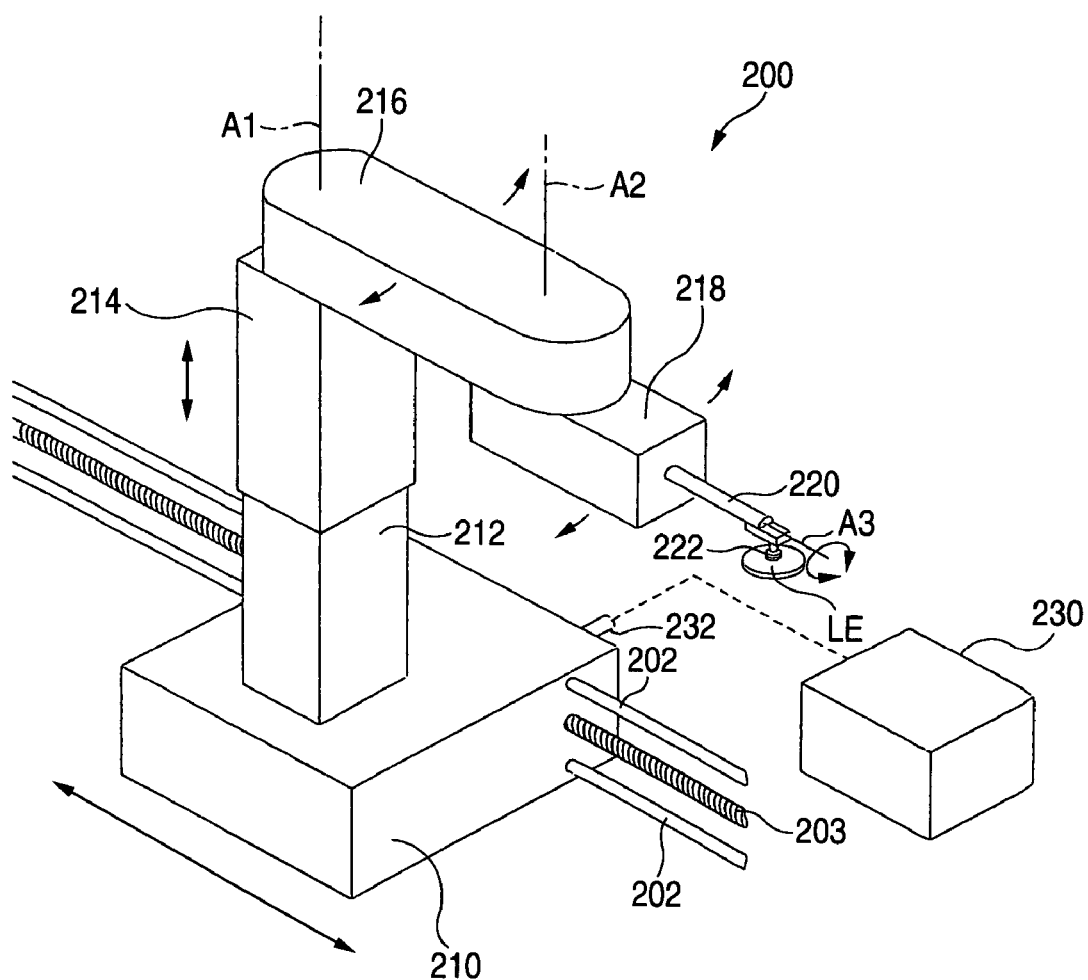
FIG. 4 is a schematic view illustrating the configuration of a robotic hand device.

FIG. 4 is a schematic view illustrating the configuration of the RH device 200. A lateral motion base 210 is moved by rotation of a ball screw 203 along two guide shafts 202 extending in the direction of the movement passage 30. A base portion 212 is provided on the lateral motion base 210. A vertical sliding portion 214 is vertically movably provided on the base portion 212. A first arm 216 rotating around a vertical axis A1 is provided at the top part of the vertical sliding portion 214. A second arm 218 rotating around a vertical axis A2 is provided at the bottom part of an end portion of the first arm 216. A third arm 220 rotating around a horizontal axis A3 is provided at an end portion of the second arm 218. Furthermore, a suction portion 222 for sucking and holding the lens LE is provided on the bottom part of an end portion of the third arm 220.

An air passage is formed through the suction portion 222. This passage is connected to a tube 232 connected to an air pump 230. The tube 232 passes through the inside of each of the lateral motion base 210, the base portion 212, the vertical sliding portion 214, the first arm 216, the second arm 218, and the third arm 220. The lens LE is sucked and held by driving the air pump 230. The sucked pressure is returned to atmospheric pressure by stopping the driving of the air pump 230, thereby the suction of the lens LE is cancelled.

<Tray (Lens) Stocking Apparatus>

As shown in FIGS. 1 and 2, the stocking apparatus 400 is provided with a transfer stage 410 and a receiving stage 420, on which the trays 401 are mounted by being vertically stacked. The stages 410 and 420 are vertically moved by vertical movement mechanism portions 412 and 422, respectively.

Figure 5:
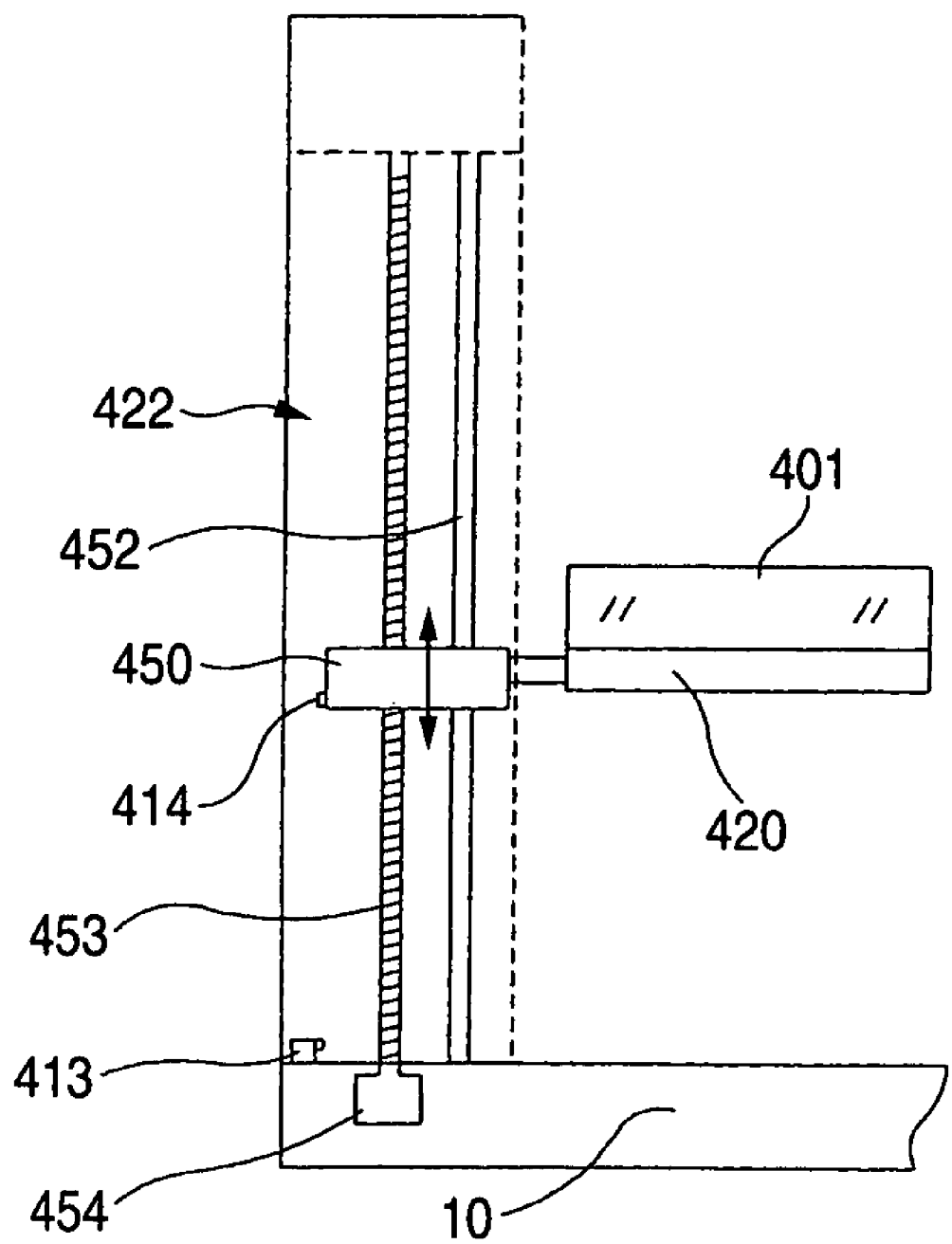
FIG. 5 is a schematic view illustrating the configuration of a vertical movement mechanism portion for a stage.

FIG. 5 is a schematic view illustrating the configuration of the vertical movement mechanism portion 422 for the stage 420. The stage 420 is horizontally attached to a stage base 450 vertically movable along a guide shaft 452 that extends vertically. A feed screw 453 connected to a pulse motor 454 and vertically extends is screwed into the base 450. Then, the screw 453 is rotated by rotationally driving the motor 454, so that the stage 420 is vertically moved together with the base 450. An origin sensor 413 including a light transmitting portion and a light receiving portion is provided at the bottom position to which the base 450 can be moved. The sensor 413 detects a light shielding member 414 attached to the base 450. Thus, it is detected whether the stage 420 is placed at the bottom reference position. Incidentally, the vertical movement mechanism portion 412 for the stage 410 is similar in configuration (or mechanism) to the vertical movement mechanism portion 422.

Ten trays 401 can be mounted on each of the stages 410 and 420 by being stacked. The tray 401 is moved from the stage 410 to the stage 420 by a clamp arm (hand) portion 430 serving as a holding unit that holds the tray 401. This arm portion 430 has a right arm (hand) 431 and a left arm (hand) 432. The right arm 431 and the left arm 432 are moved by a lateral movement mechanism portion 433 in a direction in which the arms come closer to each other, or in which the arms are moved away from each other, and are moved in the same direction between the stages 410 and 420.

A tray detection portion (light receiving portion) 403b detects whether the topmost tray 401 stacked on the stage 410 is placed at a transferring position from which the tray 401 is transferred to the arm portion 430. A tray detection portion 403c detects whether the topmost tray 401 stacked on the stage 420 is placed at a receiving position to which the tray 401 is received from the arm portion 430. When light transmitted from a light transmitting portion 403a provided at the inner center of the stocking apparatus 400 is interrupted by the tray 401, the detection portions 403b and 403c do not receive the light, and thus the system control portion 600 can detect according to output signals of the detection portions 403b and 403c whether the tray 401 is present.

Figure 6:
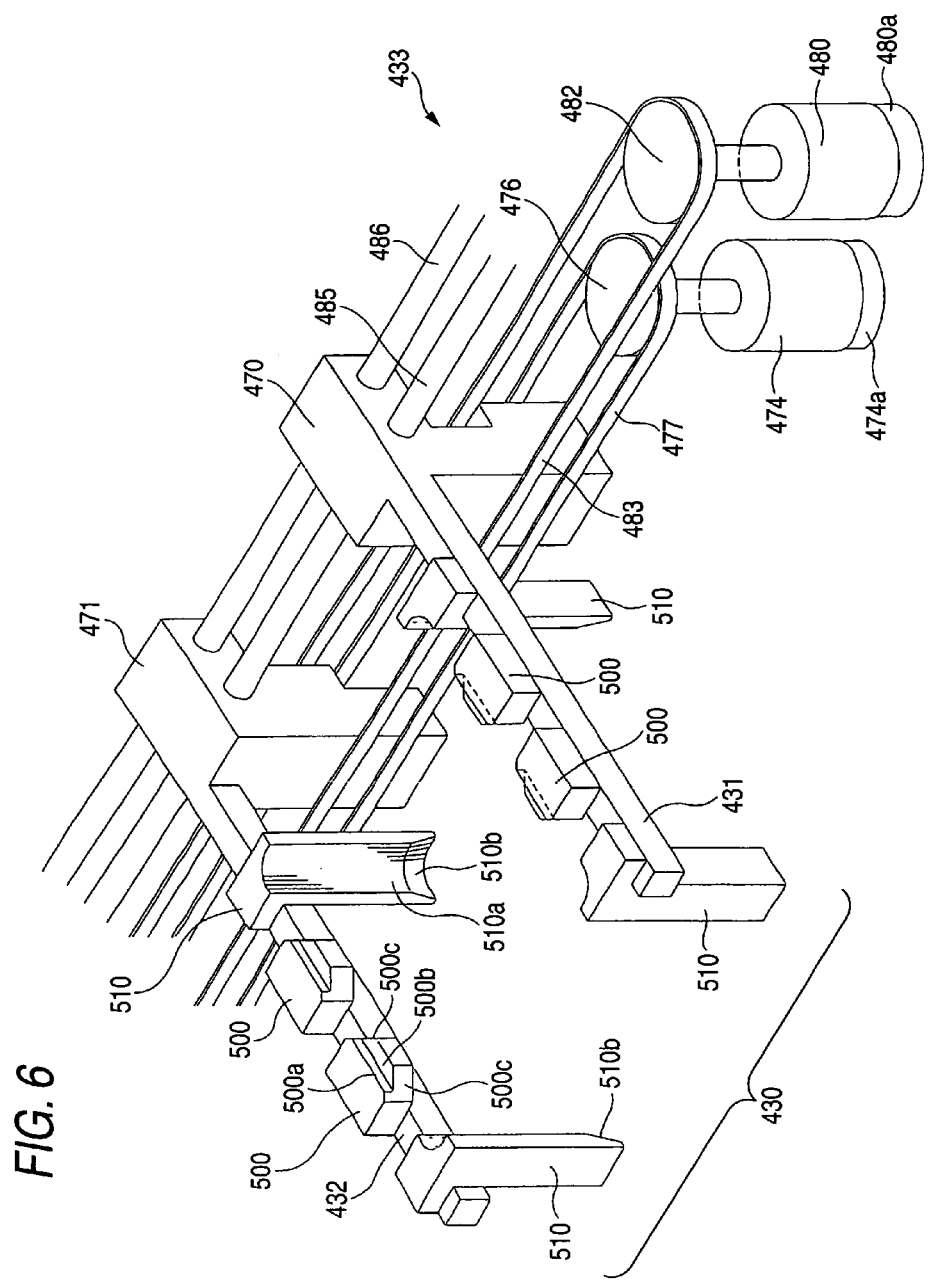
FIG. 6 is a schematic view illustrating the configurations of an arm portion and a lateral movement mechanism portion.

FIG. 6 is a schematic view illustrating the configurations of the arm portion 430 and the lateral movement mechanism portion 433. The lateral movement mechanism portion 433 has a motor 474 used to move the right arm 431, and also has a motor 480 used to move the left arm 432. Encoders 474a and 480a are attached to rotating shafts of the motors 474 and 480, respectively. A pulley 476 attached to the rotating shaft of the motor 474 is connected to a pulley provided at a left end (not shown) through a belt 477. A right arm base 470, to which the right arm 431 is fixed, is secured to the belt 477. When the motor 474 rotationally drives, the right arm base 470 is moved laterally by being guided by guide shafts 485 and 486. A pulley 482 attached to the rotating shaft of the motor 480 is connected to a pulley (not shown) at a left end through a belt 483. A left arm base 471, to which the left arm 432 is fixed, is secured to the belt 483. When the motor 480 rotationally drives, the left arm base 471 is laterally moved by being guided by guide shafts 485 and 486.

Incidentally, an origin sensor for detecting whether the base 470 is placed at a rightmost reference position is provided at a rightmost end of positions to which the base 470 can be moved. An origin sensor for detecting whether the base 471 is placed at a leftmost reference position is provided at a rightmost end of positions to which the base 471 can be moved.

Figure 7:
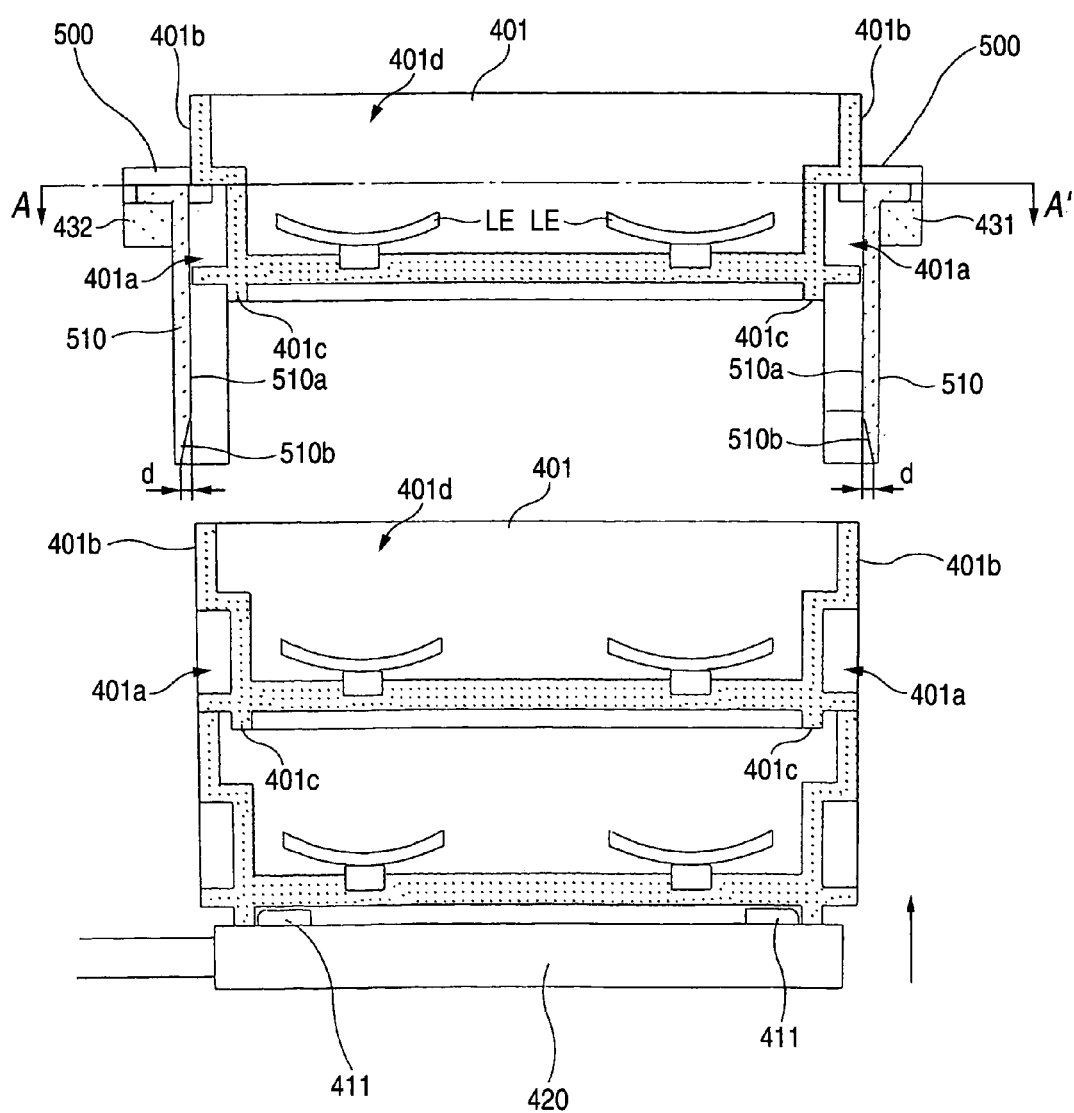
FIG. 7 is a cross-sectional view, taken from front, illustrating a state in which the arm portion holds a tray.
Figure 8:
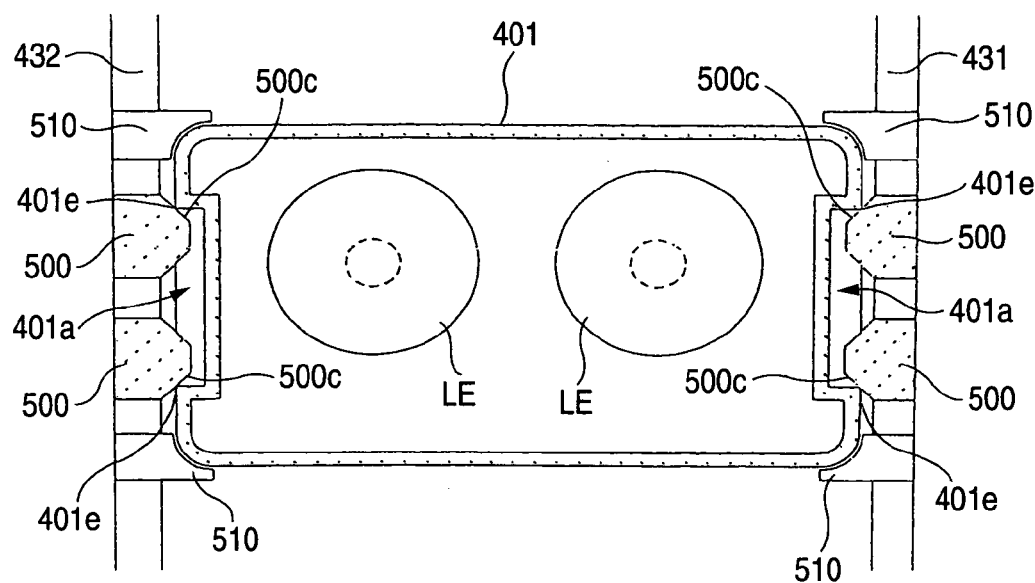
FIG. 8 is a cross-sectional taken along line A-A shown in FIG. 7.
Figure 9:
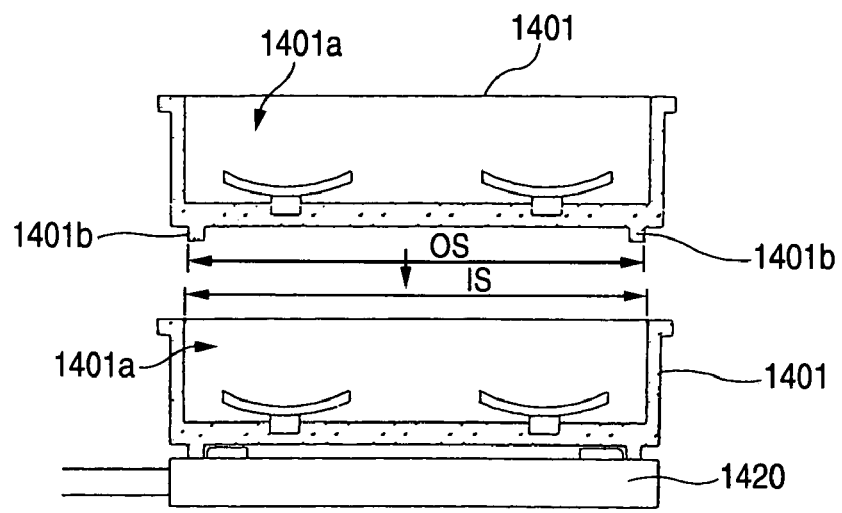
FIG. 9 is a view illustrating prior art.
Figure 9:
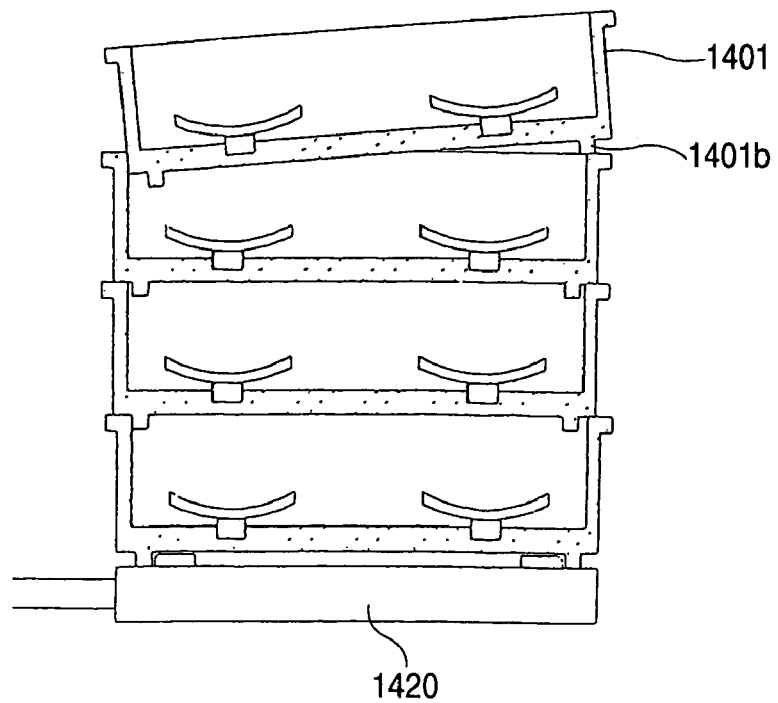

The structure of the tray 401 and the holding mechanism of the arm portion 430 are described by referring to FIGS. 6, 7, and 8. FIG. 7 is a cross-sectional view taken from front, which illustrates a state in which the arm portion 430 holds the tray 401. FIG. 8 is a cross-sectional taken along line A-A shown in FIG. 7.

A concave portion 401a is formed substantially at the center of each of left and right side surfaces of the tray 401. Thus, a convex portion 401b is formed above each of the concave portions 401a. A substantially rectangular leg 401c is formed on the bottom surface portion of the tray 401. This leg 401c is inserted into an open portion 401d of a lower tray 401. Consequently, the trays 401 can be mounted by being stacked. A guide member 411 for stably mounting the leg 401c is provided on the top surface of each of the stages 410 and 420.

Incidentally, two insertion holes, into which the bases of the cups 390 attached to the lenses LE are respectively inserted, are provided in the tray 401 corresponding to a pair of left and right lenses.

The holding mechanism of the arm portion 430 is configured corresponding to the tray 401 having such a structure. Each of the arms 431 and 431 is provided with two guide members 500 each having a step-like structure. When the tray 401 is held by the arms 431 and 432 by being interposed therebetween, a step-like surface 500a of each of the guide members 500 abuts against a side surface (an arm-side surface) of the convex portion 401b of the tray 401. A step-like surface 500b of each of the guide members 500 abuts against the bottom surface of the convex portion 401b of the tray 401. consequently, the tray 401 is guided to and placed at a holding center in the lateral direction of the arm portion 430 and can stably be held. Furthermore, an oblique surface 500c of each of the guide members 500 abuts against a side edge 401e of the concave portion 401a of the tray 401. Consequently, the tray 401 is guided to and placed at a holding center in the anteroposterior direction of the arm portion 430 and can stably be held.

Further, each of the arms 431 and 432 is provided with a guide member 510 adapted to guide the left, right, front, and back positions of the topmost one of the trays 401 stacked on the stage 420 when the held tray 401 is stacked on the trays 401 already stacked on the stage 420. Two guide members 510 are respectively provided on the arm 421 and 432 at a place corresponding to each of four corners of the tray 401 held by the arms 431 and 432. This guide member 510 has a length sufficient to downwardly protrude from the bottom surface portion of the tray 40 held by the arms 431 and 432. The guide member 510 is formed with an inner side surface 510a extending downwardly. When the trays 401 are stacked, the inner side surfaces 510a abut against four side surfaces of the lower tray 401, respectively. This inner side surface 510a is adapted to be slightly outwardly separated (about 0.3 mm) from the tray 401 held by the arms 431 and 432. This aims at regulating the left, right, front and rear displacements of the topmost tray 401 within an allowable range when the tray 401 held by the arm portion 430 (the arms 431 and 432) is stacked on the topmost tray 401 on the stage 420. Further, this aims at preventing the tray 401 placed just under the topmost tray 401 from being held by the arm portion 430 (the arms 431 and 432) when the arm portion 430 holds the topmost tray 401 on the stage 410.

Further, an oblique surface (a tapered surface) 510b outwardly gradually extending from the holding center is formed on a lower part of each of the inner side surfaces 510a. A dimension d from the inner side surface 510a to the bottom end of the oblique surface 510b is determined according to the relation with an amount of the positional displacement of the topmost tray 401. As described above, the leg 401c of a tray 401 is configured to be inserted into the open portion 401d of another tray 401 placed just under the former tray 401. Further, the inside size of the open portion 401d is slightly larger than the outside size of the leg 401c to smoothly achieve the stacking and the removing of the tray 401. In a case where the positional displacement of a tray 401 with respect to another tray 401 stacked just under the former tray 401 is 1 mm, and where nine trays 401 are stacked, a maximum displacement of the topmost tray 401 is 9 mm. Therefore, preferably, the dimension d is set to absorb this displacement. That is, preferably, the dimension d is set so that even in a case where the positional displacement of the topmost tray 401 has a maximum value, the four side surfaces of the topmost tray 401 abut against the oblique surface 510b thereby to correct the positional displacement and to guide the tray 401 to the inner side surface 510a. Thus, the inner side surfaces 510a enable adjustment of the position of the topmost tray 401 to a position at which a tray 401 can smoothly be put on the topmost tray 401.

Thus, the guide members 510 adapted to guide the topmost tray 401, on which the tray 401 held by the arm portion 430 (the arms 431 and 432), to a position, at which the trays 401 can be stacked, have a simple configuration. Consequently, the attachment of the guide members 510 can easily be adjusted.

Next, description of an operation of the processing system 1 is given below with focus on the stocking apparatus 400. Ordering data sent from the optician's shops are inputted to the host PC 620 through communication means such as the Internet. A work No. is assigned to the ordering data. Then, a barcode, into which the work No. is encoded, is placed on the tray 401 in which lenses LE are accommodated. A pair of left and right lenses LE corresponding to the ordering data are accommodated in each of the trays 401 by attaching the cups 390 to the lenses LE, respectively.

Thus, preparation of a plurality of the trays 401, in each of which lenses LE are accommodated, is performed by stacking the trays 401 on the stage 410 of the stocking apparatus 400.

Upon completion of preparing the trays 401, a start switch provided in the system control portion 600 is pushed. Then, a processing operation is performed in the processing system 1. The system control portion 600 upwardly moves the stage 410 of the stocking apparatus 400. The topmost one of the trays 401 stacked on the stage 410 is placed at the predetermined transfer height (or position). The detection portion 403b detects that the topmost tray 401 is placed at the transfer height. When the topmost tray 401 is placed at the transfer height, the system control portion 600 causes the motors 474 and 480 to rotationally drive to move the arms 431 and 432 in a direction in which the arms 431 and 432 come closer to each other. Thus, the system control portion 600 causes the arms 431 and 432 to hold the topmost one of the trays 401 stacked on the stage 410. At that time, even in a case where a positional displacement of the topmost tray 401 occurs, the displacement is corrected by the guide members 500 and 510. Consequently, the topmost tray 401 can stably be held.

Further, the work No. assigned to the topmost one of the trays 410 stacked on the stage 410 is read by the barcode reader 440 and is inputted into the system control portion 600. The system control portion 600 sends data, which corresponds to the work No., to the processing apparatus 100.

The system control portion 600 activates the RH apparatus 200 to first process a right eye lens LE. The RH apparatus 200 moves along the movement passage 30. An unprocessed lens LE for the right eye, which is accommodated in the tray 401 held by the arm portion 430 (the arms 431 and 432), is sucked by the suction portion 222. Subsequently, the unprocessed lens LE is conveyed to the processing apparatus 100. The lens LE is set in the chuck shaft 112 by downwardly directing a side of the lens LE, to which the cup 390 is attached. Thereafter, the third arm 220 of the RH apparatus 200 is separated from the processing apparatus 100. Then, the processing of the lens LE is performed by the processing apparatus 100.

When the processing of the right eye lens LE is completed by the processing apparatus 100, the lens LE processed by the RH apparatus 200 is returned to an initial position of the tray 401 held by the arm portion 430 (the arms 431 and 432). Thereafter, an unprocessed lens LE for a left eye is conveyed from the same tray 401 to the processing apparatus 100. Similarly, upon completion of processing thereof, the processed lens LE is returned to the initial position of the tray 401.

When the processing of the left and right eye lenses LE is completed, the system control portion 600 causes the motors 474 and 480 to rotationally drive. Thus, the tray 401 accommodating the processed lenses LE is moved toward the stage 420 while this tray 401 is held by the arms 431 and 432. The movement positions of the arms 431 and 432 are detected by the encoders 474a and 480a. Thereafter, the system control portion 600 causes the stage 420 to move to place the tray 401 to a predetermined receiving height (position). Then, the arm portion is slightly opened by moving the arms 431 and 432 in a direction in which the arms 431 and 432 move away from each other. Thus, the tray 401 is put on the stage 420. Thereafter, the stage 420 is downwardly moved to a height (position) at which the tray 410 is disengaged from the guide members 510.

Subsequently, the system control portion 600 causes the arms 431 and 432 to move toward the stage 410. Then, the system control portion 600 causes the arms 431 and 432 to stand ready to hold a tray 401 accommodating the next unprocessed lenses LE. Subsequently, the system control portion 600 causes the stage 410 to upwardly move to thereby place the next tray 401 at the transfer height. Thereafter, the tray 401 is held by the arms 431 and 432. Similarly to the aforementioned case, the lenses LE accommodated in the tray 401 are sequentially processed. After the processing of the lenses LE is finished, the tray 401 accommodating the processed lenses LE is moved toward the stage 420 by maintaining a state in which this tray 401 is held by the arms 431 and 432. Then, the stage 420 is upwardly moved again to place the topmost one of the trays 401 on the stage 420 at the receiving height. At that time, the topmost one of the trays 401 stacked on the stage 420 is guided by the guide members 510. Consequently, the position of the topmost tray 401 is adjusted to a position at which the tray 401 can smoothly be put thereon. Then, the arms 431 and 432 are slightly moved away from each other. Thus, the trays 401 are stacked. Thereafter, the stage 420 is downwardly moved to a height at which the tray 401 is disengaged from the guide member 510.

The trays 401 are sequentially stacked on the stage 420 by repeating the aforementioned operation. In a case where the number of the trays 401 stacked on the stage 420 is increased, an amount of positional displacement of the trays 401 stacked on the stage 420 may be increased due to vibrations caused when the stage 420 is vertically moved. Even in this case, every time the tray 401 is stacked, the displacement of the topmost tray 401, on which the former tray 401 is stacked, is corrected. Thus, the trays 401 can accurately be stacked.

Figure 10:
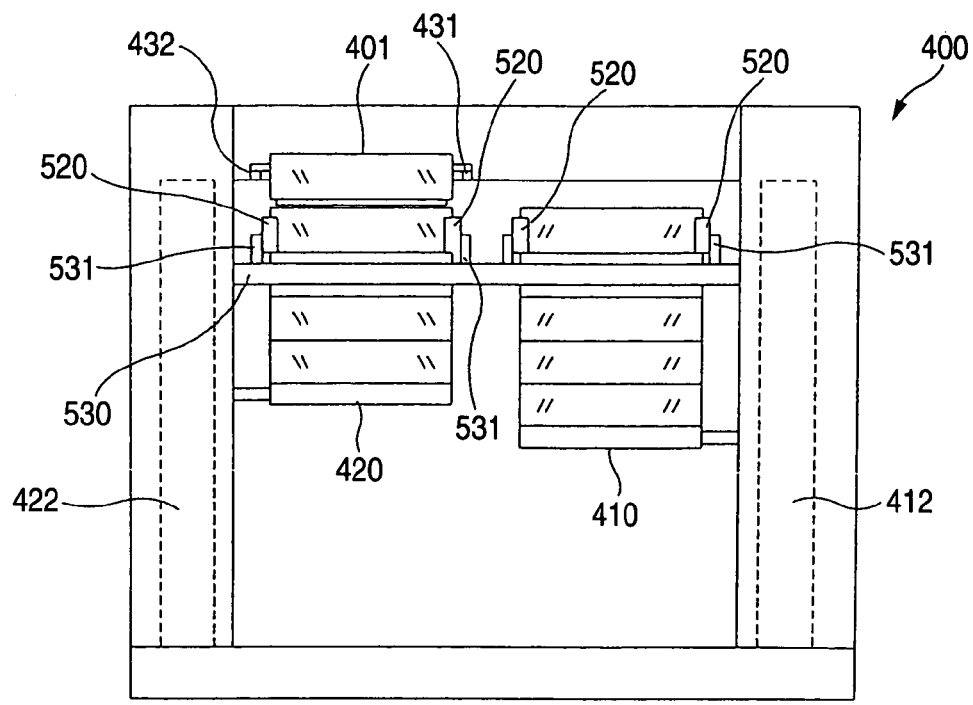
FIG. 10 is a view illustrating a modification of the embodiment of the invention.
Figure 11:
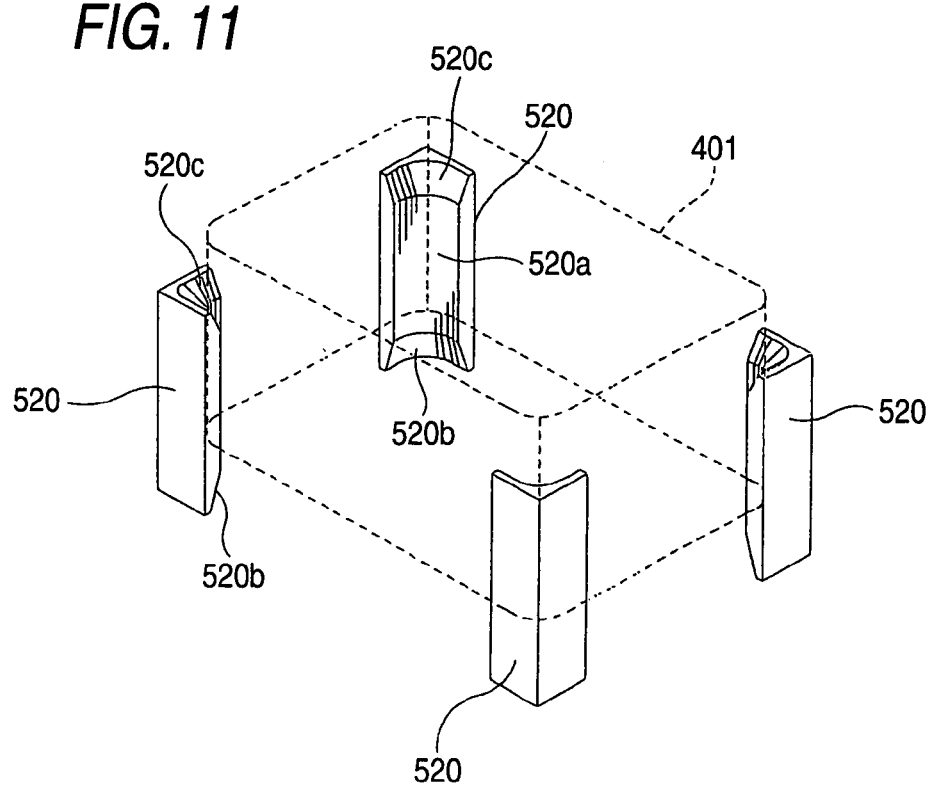
FIG. 11 is a view illustrating a modification of the is embodiment of the invention.

FIGS. 10 and 11 are views illustrating modifications of the above embodiment. In the modifications, the guide members adapted to guide the left, right, front and rear positions of the topmost one of the trays 401 stacked on the stage 420 are provided on the body of the stocking apparatus 400, instead of being provided in the arm portion 430.

In FIG. 10, reference numeral 520 designates a guide member for guiding the position of the topmost one of the trays 401 stacked on the stage 420. The guide member 520 is fixed to a frame 530 provided in the stocking apparatus 400 by a mounting member 531. Four guide members 520 are provided at the side of the stage 420. Four guide members 520 are provided at the side of the stage 410.

The structure of the guide member 520 is basically similar to that of the guide member 510 described in the foregoing description of the embodiment. As shown in FIG. 11, inner side surfaces 520a extending vertically correspond to the inner surfaces 510a of the guide members 510. Oblique surfaces (tapered surface) 520b formed at lower parts of the inner side surfaces 520a correspond to the oblique surfaces 510b of the guide members 510. Moreover, in the guide members 520, oblique surfaces (tapered surfaces) 520c are formed at upper part of the inner side surfaces 520a.

When the tray 401 held by the arm portion 430 (the arms 431 and 432) is conveyed to the stage 420 in the stocking apparatus 400 of this modification, the stage 420 is upwardly moved, so that the topmost one of the trays 401 stacked on the stage 420 is placed at the transfer height (position). At that time, the displacement of the topmost tray 401 is corrected by the guide members 520. Then, the trays 401 are stacked by moving the arms 431 and 432 slightly away from each other.

Incidentally, the guide members 520 serve to prevent the trays 401 stacked on the stage 420 from falling down. Similarly, the guide members 520 at the side of the stage 410 also serve to prevent the trays 401 stacked on the stage 410 from falling down.

Further, still another modification may be constituted by combining the configuration, in which the guide members 510 are provided at the arm portion 430, with the configuration in which the guide members 520 are provided in the body of the stocking apparatus 400. In this case, preferably, the guide members 520 is placed at a height that is slightly lower than the height (position) shown in FIG. 10. The guide members 520 serve to correct the displacement of the tray 401 when transferred and when received, and also serve to prevent the trays 401 stacked on the stages 410 and 420.

Incidentally, although the stage for the transfer (the stage 401) is adapted in the aforementioned embodiments so that the trays 401 are vertically stacked and are mounted thereon and are vertically moved, the stage for the transfer may be formed like a belt conveyer on which the trays 401 are horizontally arranged and are mounted and by which the trays 401 are horizontally moved.

The invention claimed is:

1. A lens stocking apparatus capable of stocking a plurality of lenses, comprising:
    a first stage for transfer, on which a plurality of trays each accommodating a lens are mountable;
    a second stage for reception, capable of vertically moving, on which a plurality of trays each accommodating a lens are mountable by being vertically stacked;
    a tray movement unit that includes a holding portion for holding a tray, the tray movement unit moving a tray from the first stage to the second stage, the holding portion including a pair of clamp arms for holding the tray therebetween; and
    a guide unit that guides a position of at least a topmost one of trays stacked on the second stage and corrects a positional displacement of the topmost one when the second stage is moved upwardly, the guide unit being attached to one of the pair of clamp arms and a frame of the apparatus.

2. The lens stocking apparatus according to claim 1, wherein the guide unit guides the position of the topmost tray when a tray moved by the tray movement unit from the first stage is stacked on trays already stacked on the second stage.

3. The lens stocking apparatus according to claim 2, wherein the guide unit includes a guide member provided in the holding portion.

4. The lens stocking apparatus according to claim 3, wherein
    four guide members are provided at the arms so that inner surfaces of the four guide members are located at positions opposing to four corners of the tray and extend vertically so that the guide member downwardly protrudes from a bottom surface portion of a tray held by the arms, and
    the guide member abuts against the topmost tray and guides the position of the topmost tray when the held tray is stacked on trays already stacked on the second stage.

5. The lens stocking apparatus according to claim 3, further comprising a second guide member provided in the holding portion for guiding a position of a tray held by the holding portion.

6. The lens stocking apparatus according to claim 2, wherein the guide unit includes a guide member fixed to guide the position of the topmost tray when the topmost tray on the second stage is moved by moving the second stage to a height, at which a tray to be moved from the first stage can be stacked on the topmost tray.

7. The lens stocking apparatus according to claim 1, wherein the first stage includes a stage capable of vertically moving, on which a plurality of trays are mountable by being vertically stacked, or a stage capable of horizontally moving, on which a plurality of trays are mountable by being horizontally arranged.

8. A lens processing system including the lens stocking apparatus according to claim 1, comprising:
    a lens processing apparatus for processing an edge of a lens; and
    a lens conveying apparatus for conveying an unprocessed lens, which is stocked in the stocking apparatus, from the stocking apparatus to the processing apparatus so as to process the unprocessed lens in the processing apparatus, and for conveying the lens, which is processed in the processing apparatus, from the processing apparatus to the stocking apparatus so as to stock the processed lens again in the stocking apparatus.

9. The lens processing system according to claim 8, wherein
    a tray for accommodating the unprocessed lens is mounted on the first stage of the stocking apparatus,
    a tray for accommodating the processed lens is mounted on the second stage of the stocking apparatus,
    the lens conveying apparatus conveys the unprocessed lens from the tray mounted on the first stage and conveys the processed lens to the same tray mounted on the first stage, and
    the tray movement unit moves the tray, which accommodates the processed lens, from the first stage to the second stage.

* * * * *